UNITED STATES PATENT OFFICE.

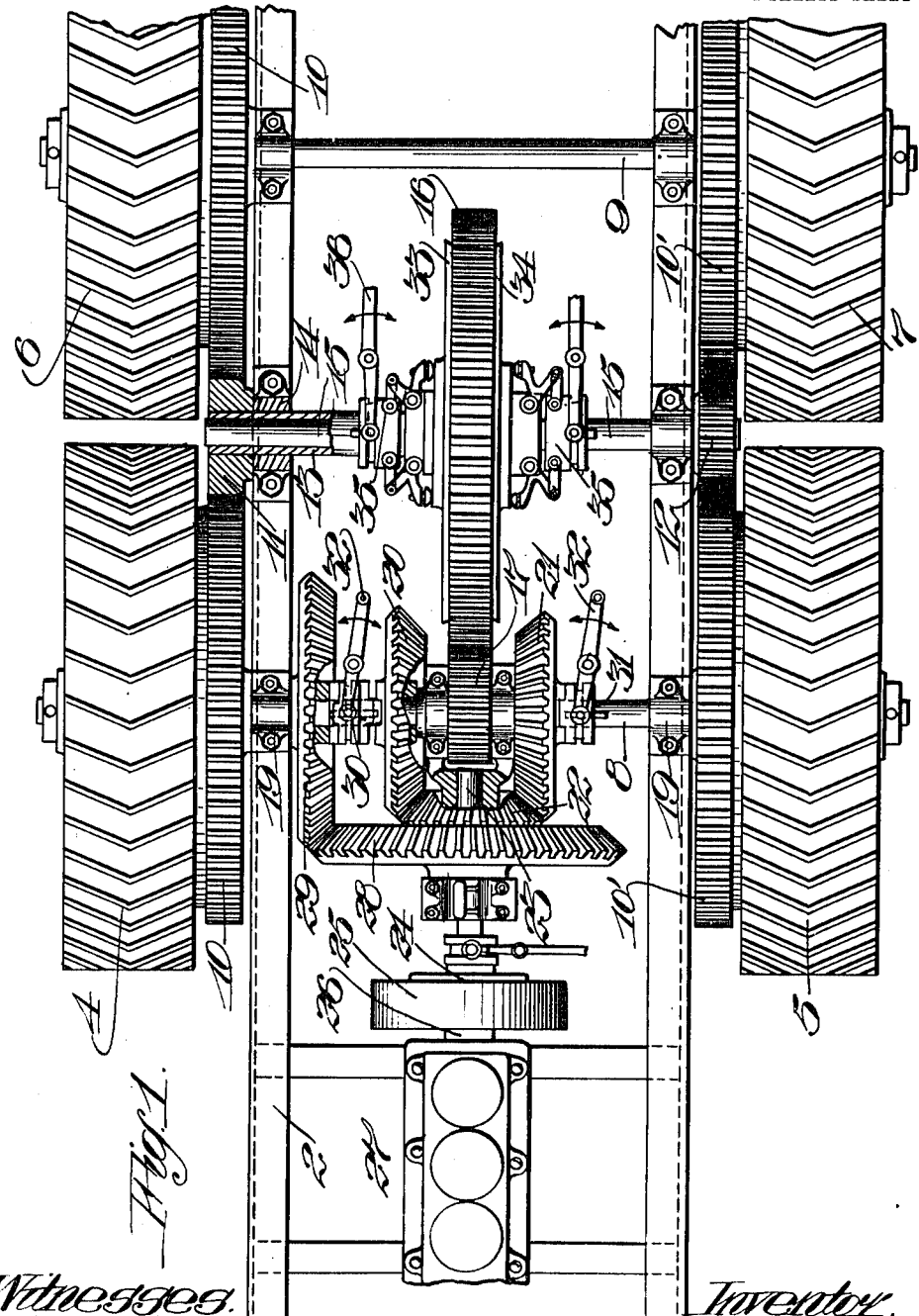

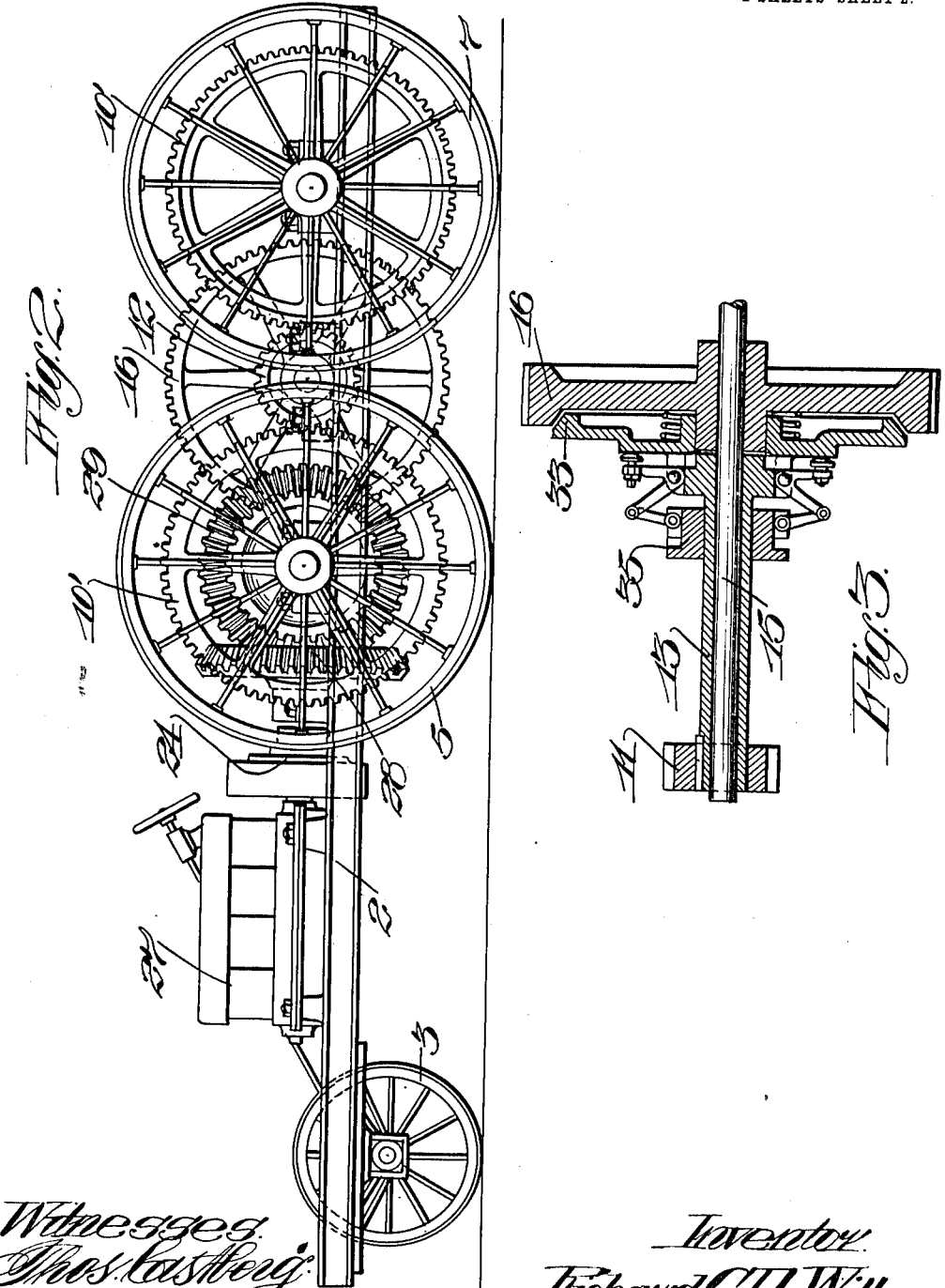

RICHARD C. DE WITT, OF SUTTER, CALIFORNIA.

TRACTION-ENGINE.

1,040,650.  Specification of Letters Patent.  Patented Oct. 8, 1912.

Application filed November 15, 1911. Serial No. 660,391.

*To all whom it may concern:*

Be it known that I, RICHARD C. DE WITT, a citizen of the United States, residing at Sutter, in the county of Sutter and State of California, have invented new and useful Improvements in Traction-Engines, of which the following is a specification.

This invention relates to motor vehicles and particularly to traction engines.

The object of the present invention is to provide a traction engine having upon each side one or more supporting grousers or wheels in combination with a clutch mechanism whereby propulsion of the vehicle by means of the grousers can be effectually accomplished, and whereby the turning of the vehicle around corners or curves is greatly facilitated.

It is also an object of the invention to provide in combination with the engine or motor and the driving wheels, a transmission mechanism capable of reversing the direction of motion of the vehicle and changing its rate of travel.

The invention consists of the parts and the construction and combination of parts, as hereinafter more fully described and claimed, having reference to the accompanying drawings, in which—

Figure 1 is a plan view, partly broken away. Fig. 2 is a side elevation. Fig. 3 is a detail sectional view of a form of clutch.

The illustrated form of my invention discloses a traction engine having an appropriate and substantial form of frame 2, upon the forward end of which is connected an appropriate style of steering mechanism, indicated at 3. The main portion of the load of the vehicle is carried by two sets of supporting ground wheels or grousers which are arranged in line on each side of the vehicle. The grousers, which are numbered as 4—6 on one side of the vehicle and 5—7 on the other side, are turnable upon suitable axles 8—9 secured to the frame 2 of the apparatus. Upon the sides of the several grousers which are nearest the frame 2 of the vehicle are suitably attached or formed gear wheels 10—10' designed to constantly mesh with driving pinions 11—12, the former of which is located between the gears 10 which are attached to the grouser wheels 4—6 so as to transmit power to drive the supporting wheels. The pinion 11, which drives the wheel 4—6, is secured upon a sleeve 13 turnable in suitable bearings, as 14, on the frame. Through the sleeve projects a shaft 15, upon the end of which opposite to the pinion 11 is secured the pinion 12. The pinion 12 is in constant engagement with and drives the grouser gears 10'.

Upon the shaft 15 is a loose master gear 16 of suitable proportions and diameter and which meshes with and is driven by a pinion 17, which is keyed upon shaft 8 mounted in appropriate bearings 19 upon the frame 2. On each side of the driving pinion 17 and turnable loosely upon the shaft 8 there are suitable bevel gears 20—21, which are in constant mesh with and driven by a bevel pinion 22. This is secured upon the end of an extension shaft 23 having a clutch mechanism 24 of appropriate design and adapted to be driven by a clutch member or wheel 25 secured to a shaft 26 of a suitable form of motor, indicated at 27. In addition to the pinion 22 there is also secured on the shaft section 23 a bevel gear 28, which is in constant mesh with another bevel gear 29 loosely mounted upon the shaft 8. By means of the several gears 20, 21 and 29, which are loosely mounted on the shaft 8, a reverse direction of travel or a different speed may be imparted to the shaft by the power derived from the engine 27.

In order to determine the speed or direction of travel of the shaft 8, I provide on each side of the pinion 17 on the shaft 8, suitable shiftable collars or clutch members 30—31, which may be longitudinally moved on the shaft 8 by any suitable form of lever mechanism, indicated at 32. The opposite faces of the clutch member 30 are designed to be shifted into locking engagement with the adjacent faces of the gear 20 or the gear 29, as may be required. In one instance, if the clutch member 30 is shifted into locking engagement with the gear 29, and if this gear be of equal diameter to the gear 28, it will be seen that the shaft 8 will, through these instrumentalities, be revolved with the same speed as that of the engine shaft and power will be transmitted through the clutch member 30, which is splined upon the shaft 8, by means of the fixed pinion 17 to its associated gear 16. If the clutch 30 is shifted along the shaft 8 into engagement with the loose gear 20, power will then be transmitted from the shaft 23 by the pinion 22 to the gear 20, which latter, if of larger diameter than the pinion 22, will cause the shaft 8 to revolve at a slower rate of speed than the engine shaft 23. Thus, when the gear 20 is interlocked with the clutch 30, pinion 17 will be revolving and driving the associated gears 16 at a slower rate of speed than that at which the engine shaft 23 is running. When it is desired to reverse the direction of travel of the vehicle, the operator shifts the clutch 30 to the neutral position between its coördinate gears 20—29 and shifts the clutch 31 into locking engagement with the gear 21; since this is revolving in a direction reverse to that of the gears 20—29, and since it is always in mesh with and constantly driven by the pinion 22, the shaft 8 will be given a direction of rotation designed to propel the vehicle backward.

Having thus described a transmitting mechanism whereby the vehicle may be propelled at different rates of speed or may be reversed in the direction of travel, it is manifest that I may utilize any appropriate form of clutch mechanism by which power transmitted to the gear 16 on the pinion shaft 15 may be further transmitted to the supporting grousers. In the present instance there is provided on each side of the gear 16 which is loosely mounted on the shaft 15 suitable clutch disks 33—34 having conical peripheries adapted to engage corresponding seats formed in the sides of the wheel 16. The clutch disk 33 is connected positively to the sleeve 13, upon which is mounted the pinion 11. Slidable upon the sleeve 13 to cause the clutch disk 33 to frictionally engage the wheel 16 is a sleeve or collar 35, which may be guided by a suitable lever or link connection 36. When the collar 35 is shifted, it presses the disk 33 into frictional engagement with the gear 16, and thus causes the sleeve 13 to revolve therewith at a like speed. When the vehicle is to be driven forward in a straight or substantially straight line, a clutch mechanism 35—35 may be operated to shift the clutch 34 into engagement with the wheel 16 and thus the pinion 12 with its shaft 15 will be revolved uniformly with the wheel 16 and the pinion sleeve 13, provided the clutch 33 is in frictional engagement with the gear 16. When the clutch devices 35—35 are thus operated simultaneously the pinions 11—12 will be driven at the same speed and power will be transmitted through the pinions and the grouser gears 10—10' to propel the vehicle in a given direction.

The direction of travel of the vehicle may be reversed at will by the shifting of the clutch 31, which will cause the driving mechanism to derive its power from the bevel gear 21, which is designed to travel in such a direction as to move the vehicle backwardly.

As hereinbefore stated, different speeds may be imparted to the vehicle by the manipulation of the clutch 30 to interlock with one or the other of the gears 20—29. The clutches 30—31 may be shifted to neutral or inoperative position and the vehicle remain idle while the engine may be still running; the motion being transmitted only as far as the loose gears 20—21—29 on the shaft 8.

It is understood that the object of the present invention is to provide in combination a vehicle frame on which is mounted a suitable source of power, as the motor 27; to provide a plurality of grouser or running wheels, of which two are provided on each side of the frame; and to provide means whereby the steering of the vehicle may be facilitated, these means including a transmitting mechanism and the several clutches whereby the grouser wheels, as 4—6, on one side of the vehicle, may be driven through the manipulation of its respective clutch mechanisms 35—33, while the other sets of grouser wheels 5—7 may be permitted to travel freely without positive or frictional connection with the driving gear 16. This peculiar function of the transmitting mechanism in aiding in the steering of the apparatus is one of the important features of the present invention. By the peculiar arrangement of the transmitting mechanism it is possible to cause the vehicle to make a turn or curve of very great radius at considerable speed by reason of the fact that one side of the bearing wheels or grousers, as, for instance, 4—6, may be coupled to the driving gear 16 by the application of the clutch disk 33 with considerable pressure against the side of the wheel. In this case the wheels 4—6 could be driven at considerable speed, whereas, at the same time, by the application of the clutch disk 34 against the opposite side of the gear 16, power could also be transmitted to the driving pinion 12 in such proportion or ratio to the power transmitted to the grouser 4—6 as would cause the grouser 5—7 to revolve at a slightly slower rate of speed than those on the opposite side of the vehicle.

Having thus described my invention, what I claim and desire to secure by Letters Patent is—

An engine comprising a frame, two pairs of driving wheels and a steering wheel, gears upon each end of the driving wheel shafts, and intermediate pinions, one of which is mounted on a countershaft and the other upon a sleeve turnable upon said shaft, a gear wheel loose upon the countershaft, a pinion engaging therewith upon one of the driving wheel shafts, a motor with its shaft journaled at right angles with the wheel and countershaft, a bevel pinion upon the motor shaft, bevel gears upon each side of the pinion upon the wheel shaft with which the bevel pinion engages, a bevel gear of larger diameter than the pinion and a coacting gear upon the wheel shaft, clutches upon the wheel shaft to engage either of the bevel gears on said shaft, and other independent clutches upon the countershaft and its sleeve to engage the countershaft gear.

In testimony whereof I have hereunto set my hand in the presence of two subscribing witnesses.

RICHARD C. DE WITT.

Witnesses:
WILLIAM E. TUCKER,
FRED B. NOYES.